Aug. 18, 1936.  W. S. HUNTINGTON  2,051,714

FOREHEAD AND TEMPLE PERSPIRATION ABSORBER

Filed Oct. 14, 1933

Inventor
Walter S. Huntington

Howard Fischer
By
Attorney

Patented Aug. 18, 1936

2,051,714

UNITED STATES PATENT OFFICE 2,051,714

FOREHEAD AND TEMPLE PERSPIRATION ABSORBER

Walter S. Huntington, St. Paul, Minn.

Application October 14, 1933, Serial No. 693,587

2 Claims. (Cl. 2—171)

My invention relates to an absorber particularly adapted for the forehead and temples, but capable of being used for similar purposes, which is designed to be attached in a suitable manner so as to shield the eyes and temples of a doctor or wearer, when operating. When a doctor is operating, if he wears glasses, or even if he does not, it is quite a disadvantage to be annoyed by perspiration which may come from the forehead and temples. If the doctor wears glasses the perspiration will impair his vision and my absorber overcomes this in a very simple and practical manner.

A feature of my absorber resides in providing a perspiration absorbent band which is made to fit the forehead and temples and is provided with a means of attaching the same so that the wearer may readily slip the same on the forehead when desired. In an operating room and in warm weather, an absorber of this character is very desirable, not only to the doctor performing an operation who requires a clear vision, but also to the golfer or others where it is desirable to protect the eyes and temples from perspiration. If one wears glasses it will be readily apparent that any perspiration from the forehead and temples is apt to fog the same or to even carry the perspiration onto the glasses in such a manner as to impair clear vision. With my absorber this is entirely eliminated in a simple and effective manner.

A feature resides in providing a perspiration absorber for the forehead having a body with a ventilated character, such as a perforated absorbent band or an absorbent band made of soft absorbent material, wherein suitable ventilating or air passageways are provided in the band so that the same will not heat the forehead and temples, but will rather act as an absorbent to take up the excess perspiration which may collect thereabout.

It will be apparent that my absorber may be made in various manners to accomplish the desired results. It is desirable to have the same simple in character, made up in a manner so that the absorber can be discarded after it has served its purpose so that it is absolutely sanitary with the absorbent body thereof and the attaching means of a sterile character, permitting it to be used by doctors and nurses in operations, as well as providing an absorber against excessive perspiration of the forehead and temples for anyone desiring to wear the same. With these desirable characteristics in mind I have provided my absorber and have found it to accomplish the desired results.

In the drawing forming part of this specification:

Figure 1:
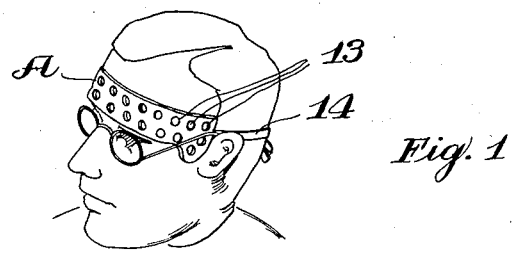
Figure 1 illustrates my absorber as it would ordinarily appear in use, attached to shield the eyes, glasses and the temples of the wearer.

My absorber A may be made with a band-like body portion 10 stamped from sheet absorbent material, with the forehead band portion positioned between the ends 11, while the ends 11 are adapted to be formed with depending portions 12 which provide a means of covering the temples. The absorbent band-like body 10 is preferably formed with ventilating openings 13 so that air may circulate through the absorber A to the foreread of the wearer and to prevent the absorber from heating the forehead unnecessarily.

My absorber A when formed of a sheet-like absorbent or several layers of sheet-like absorbent, may be stamped out from the sheet absorbent material. This absorbent material is thoroughly sterilized and made absolutely sanitary so that my absorber may be employed by doctors and nurses in performing operations of various characters. The absorber A may be of any desired size, shape and design to accomplish the desired purpose.

I provide attaching tapes 14 which are secured to the ends of the body of the absorber A in any suitable manner, such as by sewing or other suitable means of attaching the same. The tapes 14 permit the doctor or wearer to tie the absorber over the forehead very readily. In this manner I provide a perspiration absorber of a very desirable character for shielding the doctor's glasses so that he will not be annoyed or his vision impaired by perspiration while he is wearing my absorber.

Figure 2:
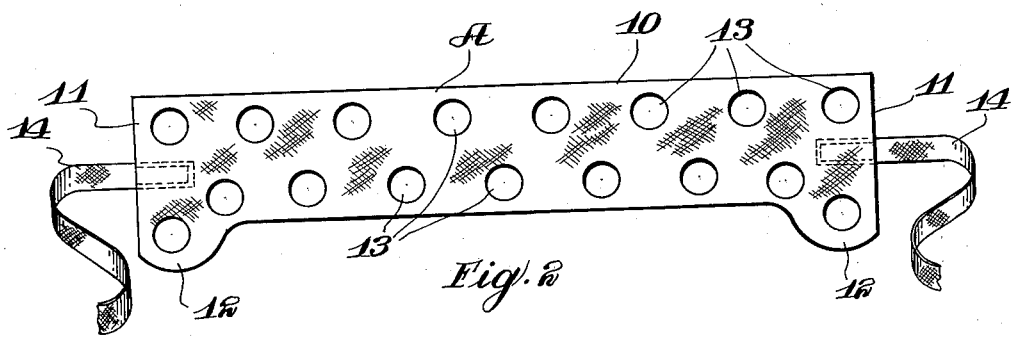
Figure 2 illustrates my absorber in one form, showing the attaching bands extending from the ends thereof.
Figure 3:
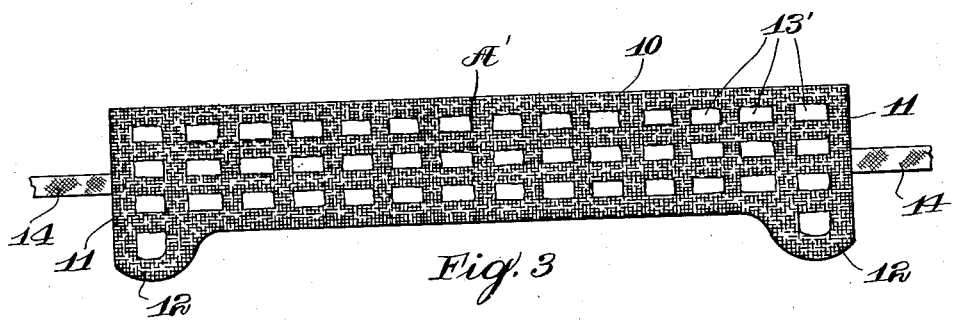
Figure 3 is a similar view to Figure 2, showing a different form of my absorber.

My absorber A' may be made in the form illustrated in Figure 3, where the body portion 10 is of the same character as that illustrated in Figure 2, being made of sheet absorbent material and having the end temple portions 11 provided with the depending portions 12. In this form the ventilating openings 13' are of a different character and shape than those illustrated in Figure 2. There are also a larger number of ventilating openings 13' in the absorber A', otherwise the general characteristics of the absorber A' are the same as the absorber A, and it is provided with attaching straps 14, only a portion of which are illustrated.

Figure 4:
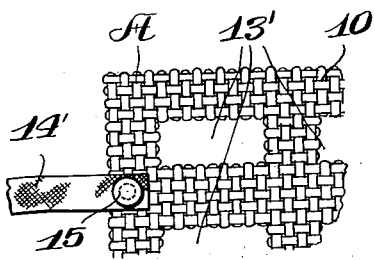
Figure 4 illustrates a detail of a woven type of my absorber.
Figure 5:
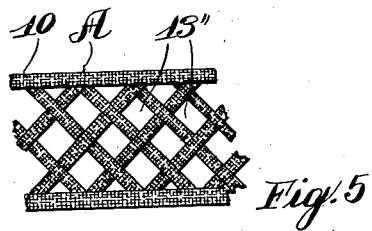
Figure 5 illustrates another woven type of my absorber.

My absorber may be made in a form where the body portion 10 is of a woven absorbent material, such as illustrated in Figure 4 and also in Figure 5. In these forms the body portion 10 which is formed of any suitable absorbent material which will readily absorb perspiration and the like, is composed of strands which are interwoven together to provide the ventilating openings 13' or 13''. The woven type of my absorber will operate in the same manner to absorb excessive perspiration from the forehead or temples so as to shield and guard the face from excessive perspiration, yet having a sufficient ventilating character so as not to tend to heat the skin of the forehead and temples. It is customary in operating rooms to clad the physicians and nurses in costumes which shield the hair and forehead and which tend to increase perspiration. However, ordinarily there is no means provided for protecting the physicians or nurses from excessive perspiration which may be caused partially by the gowns and costumes. My absorber A may be placed beneath a portion of these head and face gowns and held in any suitable manner, or may be attached thereto so as to provide a means of protecting the forehead and temples against excessive perspiration. If the physician or nurse wears glasses, it is just that much more aggravating and detrimental to be troubled with perspiration. My absorber overcomes this in a simple and effective manner.

In Figure 4 I have shown an alternative type of securing means for holding the absorber in place. A detachable strap 14', adjustable in length or formed of elastic material, is secured to the absorber by means of a snap fastener 15. Other connectors, such as hooks and eyes or buttons, could similarly be used. The absorbers of this type when purchased, are provided with one portion of the fastener to which the other portion of the fastener on the strap 14 may be attached. In some instances, this formation is found to be preferable to the permanently attached straps of Figure 2.

In making the form of absorber A illustrated in Figure 2, a single piece of material, or the device may be formed of superimposed layers of absorbent substance in order to provide a space between the layers. In some instances it has been found preferable to form the absorber A in this manner.

My absorber is equally useful and desirable for other purposes and may be used by operating dentists, or by golfers who wear glasses and are desirous of shielding their glasses against fogging, or by others, or those wearing glasses and where they desire to protect and shield their face from perspiration.

The simple, inexpensive character of my absorber provides an absolutely sanitary means of collecting the perspiration and the absorbers may be made economically so that they may be discarded after they have been used once.

I claim:

1. A perspiration absorbent eye and temple shield comprising, a sheet-like body portion formed of medicated sterilized absorbent material, a series of ventilating openings formed through said absorbent sheet when said body is in place, presenting absorbent edges, and means for supporting the same in a manner to shield the eyes and temples against excessive perspiration.

2. A perspiration absorbent eye and temple shield comprising a body portion formed of absorbent material, a series of ventilating openings formed through said absorbent material when said body is in place, presenting absorbent edges, and means for supporting said body in a manner to shield the eyes and temples from excessive perspiration.

WALTER S. HUNTINGTON.